United States Patent [19]
Eck et al.

[11] Patent Number: 5,959,017
[45] Date of Patent: Sep. 28, 1999

[54] PROCESS FOR THE MODIFICATION OF DISPERSION POWDER COMPOSITIONS

[75] Inventors: Herbert Eck; Hardy Herold; Heinrich Hopf, all of Burghausen, Germany

[73] Assignee: Wacker Chemie GmbH, Munich, Germany

[21] Appl. No.: 08/700,785

[22] Filed: Aug. 21, 1996

[30] Foreign Application Priority Data

Sep. 26, 1995 [DE] Germany .................... 195 35 833

[51] Int. Cl.$^6$ ...................................... C08K 3/00
[52] U.S. Cl. .................... 524/425; 524/427; 524/431; 524/436; 524/442; 524/445
[58] Field of Search .................... 524/425, 427, 524/431, 436, 442, 445

[56] References Cited

U.S. PATENT DOCUMENTS

| | | | |
|---|---|---|---|
| 3,883,489 | 5/1975 | Matschke et al. | 260/78.5 |
| 4,481,328 | 11/1984 | Harreus et al. | 524/493 |
| 4,859,751 | 8/1989 | Schulze et al. | 526/200 |
| 5,668,216 | 9/1997 | Kinkel et al. | 525/170 |

FOREIGN PATENT DOCUMENTS

| | | |
|---|---|---|
| 0056622 | 7/1982 | European Pat. Off. . |
| 0078449 | 5/1983 | European Pat. Off. . |
| 0149098 | 7/1985 | European Pat. Off. . |
| 0184276 | 6/1986 | European Pat. Off. . |
| 0493168 | 7/1992 | European Pat. Off. . |
| 0601518 | 6/1994 | European Pat. Off. . |
| 4402408 | 8/1995 | Germany . |

OTHER PUBLICATIONS

Derwent Abstract AN 83–46976K.
Derwent Abstract AN 92–219270.
"Ullmann", 5th edition, 1987, 9, pp. 312–336.
English translation of DE–A 4402408.

*Primary Examiner*—Edward J. Cain

[57] ABSTRACT

A process for the preparation of water-redispersible dispersion powder compositions which are modified with additives and are based on polymers of ethylenically unsaturated compounds, includes drying the corresponding aqueous polymer dispersion and applying additives, which are liquid at a temperature of $\leq 50°$ C., to a pulverulent carrier material, and then adding the resulting powder during or after drying of said dispersion.

14 Claims, No Drawings

PROCESS FOR THE MODIFICATION OF DISPERSION POWDER COMPOSITIONS

BACKGROUND OF THE INVENTION

1. Field of the Invention

The present invention relates to a process for the modification with liquid additives of water-redispersible dispersion powder compositions based on polymers of ethylenically unsaturated compounds.

2. The Prior Art

Water-redispersible dispersion powder compositions based on polymers of ethylenically unsaturated compounds are becoming increasingly important for a very wide variety of applications. The starting point for the preparation of such redispersible dispersion powders comprises the corresponding aqueous dispersions of the polymers, which are dried by means of known processes, usually with the addition of spraying aids and antiblocking agents. Drying is generally carried out by means of spray drying, with freeze-drying and, in certain cases, thin-film drying of the polymer dispersions also being possible. Processes for preparing redispersible dispersion powders are described in numerous prior patents, such as EP-A 78,449 and EP-A 149,098, which corresponds to U.S. Pat. No. 4,859,751.

To adapt the properties of the dispersion powders to the requirements of the individual applications it is often necessary to modify the dispersion powders with additives. In this context, the subsequent addition in particular of liquid additives, for instance hydrophobicizing agents, emulsifiers, adhesion promoters, crosslinking agents, biocides or film-forming auxiliaries, presents problems, since their addition frequently leads to blocking of the powders, or else the required quantity cannot be mixed in homogeneously.

EP-A 493,168 proposes the spraying, together with the polymer dispersion, of the liquid polysiloxanes employed as hydrophobicizing agents. A disadvantage of this procedure is that, in the case of co-spraying, in some cases the alkoxysilane functions of polysiloxanes can hydrolyze prematurely under the conditions of spray drying. Silanes and siloxanes with groups which hydrolyze with relative ease, for example oxime, amine and acyl groups, cannot be incorporated in this way.

The modification of dispersion powders by co-spraying the liquid additives with the polymer dispersion is also not capable of universal application in other cases. In the case of the co-spraying of numerous emulsifiers with polymer dispersions it is possible, due to interactions of the emulsifiers or else of water-soluble, liquid additives with the protective colloids which are employed as spraying aid, for the glass transition temperature thereof to be reduced to such an extent that blocking of the polymer particles takes place. This has an adverse effect on both the redispersibility of the powders and their storage stability.

Similarly, low-boiling or steam-volatile, liquid additives cannot be incorporated by co-spraying, since under the spray-drying conditions they escape, at least in part, together with the steam or inert gas. This would make it necessary to procure and operate an expensive recovery plant or a residue incineration plant for incineration of the often expensive liquid vapors which pass into the waste gas.

In the case of mixing in additives by means of co-spraying, great difficulties are caused in particular by liquid additives which are soluble in water or autoemulsifiable in water. The conceivable alternative, of mixing in such liquids to the powder subsequently, leads to the problems already mentioned above of blocking and/or inhomogeneity of the mixture.

SUMMARY OF THE INVENTION

It is an object of the present invention to provide a process for the modification with liquid additives of redispersible dispersion powder compositions, by means of which such liquids can be incorporated into the dispersion powders without decomposition of the additives, escape of the additives, premature crosslinking of the base polymer or impairment of the redispersibility of the dispersion powders.

The above object is achieved by the present invention which provides a process for the preparation of water-redispersible dispersion powder compositions which are modified with additives and are based on polymers of ethylenically unsaturated compounds comprising drying the corresponding aqueous polymer dispersions of ethylenically unsaturated compounds; applying additives, which are liquid at a temperature of $\leq 50°$ C., to a pulverulent carrier material powder; and adding the resulting powder to the dispersion during or after drying of the dispersion.

Suitable polymers of ethylenically unsaturated compounds are those having a $T_g$ of from $-60°$ C. to $+60°$ C., comprising one or more monomer units selected from the group consisting of vinyl esters of unbranched or branched alkylcarboxylic acids having 1 to 15 carbon atoms, acrylic esters and methacrylic esters of unbranched or branched, linear or cyclic alcohols having 1 to 12 carbon atoms, monoesters or diesters of fumaric acid or maleic acid with unbranched or branched, linear or cyclic alcohols having 1 to 12 carbon atoms, dienes, aromatic vinyl compounds, vinyl halides and α-olefins.

Preferred polymers are those comprising the following monomer units: (all weight percents are based upon the total monomer weight):

vinyl acetate;

vinyl acetate and ethylene with an ethylene content of from 5% to 50% by weight;

vinyl acetate and from 1% to 30% by weight of vinyl laurate or vinyl ester of an α-branched carboxylic acid having 5 to 10 carbon atoms (for example VEOVA9® or VEOVA10®) and/or norbornyl-monocarboxylic acid vinyl ester (NMCV) and from 5% to 40% by weight of ethylene;

vinyl acetate and from 1% to 30% by weight of vinyl laurate or vinyl esters of an α-branched carboxylic acid having 5 to 10 carbon atoms (for example VEOVA9® or VEOVA10®);

vinyl acetate and from 1% to 30% by weight of acrylic esters, especially n-butyl acrylate or 2-ethylhexyl acrylate;

vinyl acetate, from 1% to 30% by weight of acrylic esters, especially n-butyl acrylate or 2-ethylhexyl acrylate, and from 5% to 40% by weight of ethylene;

vinyl acetate, from 1% to 30% by weight of vinyl laurate or vinyl esters of an α-branched carboxylic acid having 5 to 10 carbon atoms (for example VEOVA9® or VEOVA10®), from 1% to 30% by weight of acrylic esters, especially n-butyl acrylate or 2-ethylhexyl acrylate, and from 5% to 40% by weight of ethylene;

methyl methacrylate and from 35% to 65% by weight of acrylic esters, especially n-butyl acrylate and/or 2-ethylhexyl acrylate;

styrene and from 35% to 65% by weight of acrylic esters, especially n-butyl acrylate and/or 2-ethylhexyl acrylate;

vinyl chloride and at least 5% by weight of ethylene and, if desired, up to 70% by weight of vinyl laurate or vinyl esters of an α-branched carboxylic acid having 5 to 10 carbon atoms (for example VEOVA9® or VEOVA10®).

If desired, the above-mentioned polymers comprise from 0.05% to 10.0% by weight, based on the total weight of the polymer, of one or more auxiliary monomers selected from the group consisting of ethylenically unsaturated carboxylic acids, preferably acrylic acid, methacrylic acid, crotonic acid, maleic acid or fumaric acid; or selected from the group consisting of ethylenically unsaturated carboxamides, preferably acrylamide and 2-acrylamidopropanesulfonic acid; or selected from the group consisting of ethylenically unsaturated sulfonic acids and their salts, preferably vinylsulfonic acid; or selected from the group consisting of polyethylenically unsaturated comonomers, for example divinyl adipate, 1,9-decadiene, allyl methacrylate, triallyl cyanurate; or selected from the group consisting of silicon-containing ethylenically unsaturated compounds, for example γ-acryloyl-, γ-methacryloyloxypropyltri(alkoxy)silanes and vinyltrialkoxysilanes, and the corresponding vinylmethyl-dialkoxysilanes; or selected from the group consisting of N-methylolacrylamide (NMA), N-methylolmethacrylamide (NMMA), N-(alkoxymethyl)acrylamides, N-(alkoxymethyl)methacrylamides, and ethylenically unsaturated compounds comprising epoxy groups, for example glycidyl (meth)acrylate; and also ethylenically unsaturated compounds comprising amine groups or hydroxyl groups, such as hydroxyethyl (meth)acrylate, hydroxypropyl (meth) acrylate.

The aqueous polymer dispersion on which the dispersion powders are based is preferably prepared by the emulsion polymerization process. The emulsion polymerization is carried out in an open reaction vessel or in pressure vessels, preferably in a temperature range from 0° C. to 100° C., and is initiated with the methods which are customarily employed for emulsion polymerization. Initiation takes place by means of the customary water-soluble free-radical initiators, which are preferably employed in quantities of from 0.01% to 1.0% by weight, based on the total weight of the monomers. Examples of such initiators are ammonium persulfate and potassium persulfate, alkyl hydroperoxides such as tert-butyl hydroperoxide; or are hydrogen peroxide. If desired, the above-mentioned free-radical initiators can also be combined in a known manner with from 0.01% to 0.5% by weight, based on the total weight of the monomers, of reducing agents. Suitable examples are formaldehyde-sulfoxylate salts, sodium bisulfite or ascorbic acid. In the case of redox initiation, one or both redox catalyst components are preferably metered in during the polymerization.

The polymerization can be carried out continuously or batchwise, with or without the use of seed latices, with all or individual constituents of the reaction mixture being included in the initial charge or with some being included in the initial charge and the remainder being metered in to the reaction mixture subsequently, or, without an initial charge, by the metered addition technique. All of the metered additions preferably take place in step with the consumption of the respective component.

Dispersants which can be employed are all protective colloids and emulsifiers which are customarily used in emulsion polymerization. It is possible to employ from 0% to 4% by weight of emulsifier, based on the total weight of the monomers. Polymerization is preferably carried out with quantities of emulsifier of <1.0% by weight, or without emulsifier on account of the problems discussed at the outset.

Suitable examples are anionic surfactants, such as alkyl sulfates with a chain length of 8 to 18 carbon atoms, alkyl ether sulfates and alkylaryl ether sulfates having 8 to 18 carbon atoms in the hydrophobic radical and up to 40 ethylene oxide or propylene oxide units, alkylsulfonates or alkylarylsulfonates having 8 to 18 carbon atoms, esters and monoesters of sulfosuccinic acid with monohydric alcohols or alkylphenols. Suitable nonionic surfactants are, for example, acetylene glycols such as SURFYNOL® from Air Products.

As dispersants it is preferred to employ protective colloids, generally in quantities of up to 50% by weight, based on the total weight of the monomers, depending on viscosity and type. Examples of these are vinyl alcohol/vinyl acetate copolymers with a content of from 80 to 100 mol % of vinyl alcohol units, polyvinylpyrrolidones with a molecular weight of from 5000 to 400,000, hydroxyethyl-cellulose, carboxymethyl-cellulose, hydroxypropyl-cellulose and/or methyl-substituted celluloses with a degree of substitution in the range from 1.5 to 3, water-soluble starches and starch derivatives, and other water-soluble polysaccharides or water-soluble derivatives thereof, and also phenol-formaldehyde sulfonate and naphthalene-formaldehyde sulfonates, styrene/maleic acid and vinyl ether/maleic acid copolymers, and water-soluble proteins such as casein and gelatine.

The pH range desired for the polymerization, which is generally between 2.5 and 7, can be established in a known manner by means of acids, bases or customary buffer salts, such as alkali metal phosphates or alkali metal carbonates. To adjust the molecular weight it is possible to add, in the course of polymerization, the customary regulators, for example mercaptans, aldehydes and chlorinated hydrocarbons.

The solids content of the aqueous dispersions is preferably from 20% to 60% by weight based upon the total weight of the aqueous dispersion.

To prepare the redispersible dispersion powder compositions the aqueous polymer dispersions are finally dried. Suitable drying techniques are, for example, spray drying and freeze drying. In some cases, if the product does not plastify under the drying conditions, it is also possible to use roller driers, belt driers or disk driers. The dispersions are preferably spray-dried or freeze-dried.

The most preferred technique is the spray drying of the dispersions. In this context it is possible to make use of the known devices, for example spraying through single-, dual- or multi-substance nozzles or with a rotating disk, in a stream of dry gas, preferably air, which is at ambient temperature or heated. In general, temperatures above 250° C. are not employed as the entry temperature of the dry gas. The exit temperatures of the dry gas are in general in the range from 55° to 100° C., preferably from 65° to 90° C., depending on the apparatus, composition of the product and degree of drying desired.

For drying, the dispersions are adjusted to a solids content of from 10% to 75% by weight, preferably from 20% to 65% by weight. The solids content is dependent on the chosen drying technique and on the nature and quantity of other additives which are added in the course of drying.

For example, it is possible to add spraying aids to the dispersion prior to drying. Addition takes place preferably in the form of their aqueous solutions, in quantities of preferably from 5% to 40% by weight, in particular from 5% to 20% by weight, based on the polymer. The optimum quantity depends on the stabilization of the dispersion, on the glass transition temperature of the polymer present and on the desired powder properties.

Suitable spraying aids include, alone or in combination, cyclodextrins, cyclodextrin derivatives, degraded or modified starches, starch derivatives, cellulose derivatives and other water-soluble polymers, especially those having high glass transition temperatures of at least 50° C. Examples of such polymers, many of which are commercially available, are: vinyl alcohol copolymers (polyvinyl alcohol) with a degree of hydrolysis of preferably from 80 to 97 mol % and a Höppler viscosity, determined in 4% strength solution, of preferably from 3 to 25 mPa; preferably fully hydrolyzed copolymers of vinyl acetate and, for example, ethylene, N-vinylamides, unsaturated carboxylic acids or alkyl vinyl esters, preferably with a Höppler viscosity of from 1 to 25 mPa.s; vinylpyrrolidone (co)polymers; ligninsulfonates; water-soluble naphthalene-formaldehyde or melamine-formaldehyde condensation products containing sulfonate groups; phenolsulfonic acid-formaldehyde condensation products; polyacrylamides; copolymers of styrene and maleic acid and/or itaconic acid and esters thereof; water-soluble copolymers of olefinically unsaturated acids and alkenes; water-soluble copolymers of monomers such as acrylic acid, methacrylic acid, itaconic acid, fumaric acid, methyl (meth)acrylate, ethyl (meth)acrylate, butyl (meth) acrylate, ethylhexyl acrylate, decyl acrylate, hydroxyethyl (meth)acrylate, hydroxypropyl (meth)acrylate.

When spraying it has proven favorable in many cases to have a content of up to 1.5% by weight of antifoam, based on the base polymer. Liquid antifoams are normally added to the dispersion prior to drying, while solid antifoams can be mixed into the dry dispersion powder composition.

In order to increase the storage properties by improving the blocking stability, especially in the case of powders with a low glass transition temperature, it is possible to add to the resulting powder an antiblocking agent, preferably in a proportion of up to 30% by weight, based on the total weight of polymeric constituents. This addition is preferably made during the drying operation and/or while the powder is still finely divided, for example while it is still suspended in the drying gas. In particular, the antiblocking agent is metered into the drying apparatus separately from but simultaneously with the dispersion. Examples of antiblocking agents are finely ground aluminum silicates, kieselguhr, colloidal silica gel, pyrogenic silica, precipitated silica, microsilica, calcium sulfate, kaolin, talc, cements, diatomaceous earth, magnesium carbonate and/or calcium carbonate or magnesium hydrosilicate.

In order to incorporate additives which are liquid at temperatures of $\leq 50°$ C., preferably $<35°$ C., they are applied to a pulverulent carrier material. Liquid additives in this context are understood as being those which are in a liquid or pastelike state at the maximum storage temperatures of redispersible powders, generally $\leq 50°$ C.

Preferred examples of such liquid or pastelike additives are, selected from the group consisting of water-soluble liquids or liquids which are autoemulsifying in water: ethylene glycol, propylene glycol, pentanediol, polyethylene glycol and ethylene glycol-propylene glycol copolyethers, ethylene glycol bisacetoacetate, acetylacetone, hexamethylenediamine, γ-aminopropyltriethoxysilane, emulsifiers which are pastelike or liquid at room temperature, such as alkylphenol (oligo)glycol ethers, for example various ARKOPAL® N grades from Hoechst AG or the GENAPOL® OX grades from Hoechst AG. However, it is also possible to admix to the powders amphoteric, anionic and cationic emulsifiers of corresponding consistency which cannot be admixed directly to the redispersible powders due to the difficulties mentioned at the outset and can also not be added prior to their preparation, for example prior to spray drying, incorporation now being possible with simplicity and economy in the manner according to the invention. Compilations of emulsifiers can be found, for example, in "Ullmann", 5th edition, 1987, 9, p. 312 ff., in the "Tensid-Taschenbuch", Carl Hanser Verlag, Munich, Vienna 1990 and "McCutcheons Emulsifiers and Detergents", 1986.

Preferred examples of such liquid or pastelike additives are, selected from the group consisting of water-insoluble liquids: film-forming auxiliaries and plasticizers such as BCA (ethylene glycol monobutyl ether acetate), dimethyl phthalate, dibutyl phthalate, diethylhexyl phthalate, dibutyl adipate; or catalysts such as butyl hydroperoxide, lauroyl peroxide; or siloxanes and silanes which act as hydrophobicizing agents and/or crosslinking agents, such as ethylhexyltriethoxysilane, hexamethyldisiloxane, γ-mercaptopropyltriethoxysilane, methyltriethoxysilane in monomeric or partially condensed form.

Liquid isocyanates which can be employed as crosslinking agents and/or foam producers (evolution of $CO_2$ on reaction with water), such as hexamethylene diisocyanate, 2,4-tolylene diisocyanate and 2,6-tolylene diisocyanate.

References to water-soluble liquids or liquids which are autoemulsifying in water should be understood in general as being to those liquids which are soluble or emulsifiable to the extent of at least 1 g per 1000 g of water at room temperature and under the pressure of the surrounding atmosphere. The procedure of the invention is particularly preferable for the incorporation of water-soluble liquid additives or liquid additives which are autoemulsifying in water.

The particle size of the pulverulent, inorganic or organic carrier materials is preferably from 0.005 to 3000 µm, in particular up to 500 µm. Suitable carrier materials having an adsorptive action are preferably finely divided solids of maximum BET surface area, preferably >5 $m^2/g$, particularly preferably >10 $m^2/g$.

The chemical composition and morphology of the pulverulent carrier materials is also important, since they determine whether the liquid additives are adsorbed on the surface of the carrier material and/or enclosed in its cavities, or whether they dissolve in the carrier material.

For many applications it is advantageous if the carrier material employed is an adsorbent in which the substance adsorbed (liquid additive) is insoluble or only very sparingly soluble under the conditions of preparation and storage, since in this case the additive is liberated rapidly on use even after a long storage period.

Particular preference, therefore, is given to porous adsorbents having a liquid uptake of from 10% to 75% by weight, in particular from 15% to 60% by weight, based on the total weight of carrier material. In this context the liquid uptake of such carrier materials can be determined by means of common methods, for example by determining the DOP uptake in analogy to DIN 53417, or by determining the mercury porosity with apparatus such as Autopore II 9220.

Rapid unfolding of the action of the additives following redispersion of the powder can also be achieved if porous carrier materials are used which are, in addition, water-soluble, this term being understood as meaning that the quantity of water employed in the envisaged application is sufficient to dissolve the carrier material. This is generally the case when the water-solubility of the carrier material under normal conditions is at least 1 g per 1000 g of water.

Examples of carrier materials with an adsorptive action and/or carrier materials which enclose the liquids within their pores are precipitated chalk and other finely divided carbonates, such as magnesium carbonate and/or calcium carbonate, and also magnesium hydrosilicates, finely divided titanium dioxide, argillaceous earths, bleaching earths, activated alumina, vermiculites such as bentonite, expanded perlite, and phosphates such as Na phosphate.

Also suitable are organic materials such as, for example, water-soluble or water-insoluble polyvinyl alcohol powders; pulverulent, water-soluble or water-insoluble cellulose (derivatives), such as cellulose powders and cellulose ether powders; pulverulent, water-soluble or water-insoluble starch (derivatives) such as starch powders; polyvinyl chloride powders, in particular S-PVC, and polystyrene powders.

If a delayed action is desired, use is made of water-insoluble carrier materials in which the liquid additives are soluble. If there is a risk of the liquid substances added penetrating into, for example, the protective colloid due to their good compatibility with it, on prolonged storage, or of the liquid substances slowly escaping due to their low vapor pressure, it is likewise advisable to employ carrier materials which dissolve these substances without becoming tacky in doing so and thereby having an adverse effect on the blocking stability and redispersibility of the dispersion powder composition. Preferably employed for this purpose are those carrier materials which can take up more than 10%, preferably more than 20%, of their weight of the liquid additive without becoming sticky.

If it is desired to add the liquid to the redispersible powder in a form in which it is extensively dissolved in the carrier material, use is preferably made of crosslinked materials, for example rubbers such as natural rubber, isoprene rubber, styrene-butadiene rubber, chloroprene rubber, butadiene-acrylonitrile rubber, isobutylene-isoprene rubber, ethylene-propylene-diene rubber, acrylate-butadiene rubber, polysulfide rubber, silicone rubber, butadiene rubber or epichlorohydrin-ethylene oxide rubber; and thermosetting resins such as epoxy resins, melamine-formaldehyde resins, urea-formaldehyde resins and phenol-formaldehyde resins, polyester resins and silicone resins. Further examples are crosslinked polyvinyl alcohols and crosslinked polysaccharides, such as crosslinked starches or crosslinked celluloses. As is known, such products are able to take up particularly large quantities of liquid without losing their solid character in the process.

It is of course also possible to use the known adsorbents, carbon black and highly disperse silica, but these are not preferred due to the black color and, respectively, due to the high price and often also owing to excessive adhesion of the adsorbed liquids. Appropriate selection of the carrier material must always be such as to ensure that no chemical bonding takes place between the carrier material and the liquid, insofar as such bonding would prevent liberation of the liquid and/or its intended action under the prevailing conditions.

The quantitative ratio of pulverulent carrier material to liquid additive depends on the nature of the additive, its morphology and the type of binding to the carrier material, adsorptive or absorptive. In general from 15% to 60% by weight of one or more liquid additives are adsorbed on from 40% to 85% by weight of one or more carrier materials and/or dissolved in the carrier material, the percentages by weight being based on the total weight of the carrier materials and additives.

The liquids can be applied to the carrier materials in any desired apparatus which is suitable for powder mixtures, in which context high shear forces have an adverse effect in many cases. Suitable apparatus is described in Schaab/ Stoeckhert, Kunststoffmaschinenführer, Carl Hanser Verlag, Munich, Vienna 1979.

Examples of suitable apparatus include continuously operating or batchwise-operating screw belt mixers, double-spiral mixers, blade mixers, plowshare mixers and high-speed and low-speed paddle mixers. Other examples include turbulent screw mixers and trough mixers. Mixers with rotating mixing containers can also be used, for example the gyro-wheel-type mixers, tumble mixers, double-cone mixers and V mixers. Mixing generally takes place at room temperature.

In other embodiments, however, it is advantageous to carry out the mixing at elevated temperature. This is often the case when the viscosity of the liquid or even pastelike substance at room temperature is too high for uniform incorporation. This is also the case when the substance has a melting point which is just above room temperature or when it is desired to dissolve the substance wholly or partially in the carrier material.

In general it is advantageous initially to charge the carrier material to the mixing vessel and to meter in the liquid, or even if appropriate to spray it on. Mixing can of course be carried out continuously as well as batchwise.

The mixing-in of the resulting powders to the redispersible powders can also be carried out continuously or batchwise in similar mixing equipment, generally at room temperature. The pulverulent additive/carrier material composition can be added during the drying of the dispersion, especially during spray drying, or can be added to the dispersion powder after the end of the drying operation. A preferred technique is to add the pulverulent additive/carrier material composition after drying. It is particularly preferred to meter the powder continuously into the spray drier, after the operation of drying the polymer dispersion has been carried out, together if desired with other additives which can be mixed in in a customary manner. Examples of other additives include antiblocking agents, antifoams, foam stabilizers, fillers, colorants, biocides, and/or thickeners.

The quantity in which the additive/carrier material composition is added to the dispersion powder during or after its drying is arbitrary and depends on the quantity of additive desired in the dispersion powder composition.

The process according to the invention is particularly advantageous in the case of low-boiling substances and steam-volatile substances. In such cases, a recovery unit which is expensive to procure and to operate (energy-intensive), or combustion of the often expensive liquid vapors entering the waste gas, would be necessary. This can be necessary even for liquids having a relatively high boiling point of around 350° C., due to their steam-volatility. With liquids having a boiling point <250° C. it is frequently the case, and for those which boil below 160° C. it is virtually always the case.

It should additionally be pointed out that with the known processes the incorporation of water-soluble liquid substances, but also those which are autoemulsifying in water, into redispersible powders is often more difficult than in the case of water-insoluble liquids.

The process according to the invention is also particularly advantageous for liquid additives which become volatile or are altered in the course of the preparation of the redispersible powders by the known processes. Examples of such alteration include by hydrolysis, interaction with other powder constituents or decomposition, or if these additives reduce the storage properties or redispersibility of the dispersion powder composition. Examples of these are:

Emulsifiers which are used as rheological additives but which due to interaction with the protective-colloid fraction may lead to blocking of the dispersion powders.

Plasticizers or film-forming auxiliaries for lowering the film-forming temperature, such as BCA, which on the basis of their relatively low boiling point are intended to lower the hardness of the film only temporarily. Consequently, when added during drying, they may become volatile or may promote blocking.

Hydrolysis-sensitive additives for promoting adhesion and/or hydrophobicizing, such as silanes, for example γ-aminopropyltriethoxysilane and methyltriethoxysilane and propyltriethoxysilane.

Reactive crosslinking agents for improving the solvent resistance of the copolymer by crosslinking, for example diamines, bisacetoacetates and isocyanates.

Reactive catalysts such as peroxides, for example.

With the previously known techniques for modifying dispersion powder compositions it is in many cases possible not to add these liquids to the redispersible powder until the point of application, for example on the building site. However, in this case there is the risk of unfavorable admixing, unfavorable that is in terms of the technique used or quantities added. Finally, the process of the present invention also makes it possible to influence the time at which the action of the added liquid begins, depending on whether the carrier used is one on which the liquid is adsorptively bound or one in which it is partially or completely dissolved.

Other objects and features of the present invention will become apparent from the following Examples, which disclose the embodiments of the present invention. It should be understood, however, that the Examples are designed for the purpose of illustration only and not as a definition of the limits of the invention.

EXAMPLES

General procedure:

350 g of the carrier material were placed in a customary kitchen machine and the liquid was added dropwise at room temperature over the course of about 30 minutes. Stirring speed: Stage 1. After stirring for 10 minutes, the pulverulent mixture was discharged into containers.

This powder composition was admixed with the dispersion powder composition in the same apparatus, likewise at room temperature. All the ratios in the examples are based upon weight.

EXAMPLE 1

235 g of ARKOPAL® N 060 (alkylphenol (oligo)glycol ether from Hoechst) were applied as described above to 350 g of polyvinyl alcohol WX 28/20® and the composition was admixed with the polyvinyl alcohol-stabilized, redispersible powder based on a vinyl acetate/ethylene copolymer (RE 545 Z® from Wacker-Chemie) in a ratio of 5:98.

There was no increase in the blocking tendency in comparison with the dispersion powder not modified with ARKOPAL®. The redispersibility was likewise unchanged and good.

EXAMPLE 2

190 g of ARKOPAL® N 060 (alkylphenol (oligo)glycol ether from Hoechst) were applied as described above to 350 g of polyvinyl chloride (VH 315/100® from Vinnolit) and the composition was admixed with the polyvinyl alcohol-stabilized, redispersible powder based on a vinyl acetate-VeoVa-vinyl laurate copolymer (RI 538 Z® from Wacker-Chemie) in a ratio of 5.7:98.

There was no increase in the blocking tendency in comparison with the dispersion powder not modified with ARKOPAL®. The redispersibility was likewise unchanged and good.

COMPARISON EXAMPLE 1

In the preparation of the redispersible powder employed in Example 2 (RI 538 Z®) the batch was admixed prior to the spraying of the aqueous dispersion of the copolymer with 2% by weight of ARKOPAL® N060, based on solids content. Even before storage, the resulting powder contained nonredispersible lumps. The wall of the drier, especially at the cone near to the outlet, was also heavily covered. The screened powder had a strong blocking tendency. The redispersibility was markedly poorer than that of the product from EXAMPLE 2.

EXAMPLE 3

75 g of ARKOPAL® N 100 (alkylphenol (oligo)glycol ether from Hoechst) were applied as described above to 350 g of bentonite and the composition was admixed with the polyvinyl alcohol-stabilized, redispersible powder based on a vinyl acetate/ethylene copolymer (RE 526 Z® from Wacker-Chemie) in a ratio of 17.5:98.

There was no increase in the blocking tendency in comparison with the dispersion powder not modified with ARKOPAL®. The redispersibility was likewise unchanged and good.

EXAMPLE 4

190 g of ARKOPAL® N 060 (alkylphenol (oligo)glycol ether from Hoechst) were applied as described above to 350 g of polyvinyl chloride (VH 315/100® from Vinnolit) and the composition was admixed with the polyvinyl alcohol-stabilized, redispersible powder based on a vinyl acetate-N-methylolacrylamide copolymer with 0.8% by weight NMA fraction (LL 5001® from Wacker-Chemie GmbH) in a ratio of 5.7:98.

There was no increase in the blocking tendency in comparison with the dispersion powder not modified with ARKOPAL®. The redispersibility was likewise unchanged and good.

EXAMPLE 5

190 g of BCA (plasticizer based on ethylene glycol monobutyl ether acetate) were applied as described above to 350 g of polyvinyl chloride (VH 315/100® from Vinnolit). 8.7 g of the resulting powder were admixed with 97.3 g of a polyvinyl alcohol-stabilized, redispersible powder based on a vinyl acetate-N-methylolacrylamide copolymer with 0.8% by weight NMA fraction which contained 10% by weight of hydrites as antiblocking agents.

There was no increase in the blocking tendency in comparison with the dispersion powder not modified with ARKOPAL®. The redispersibility was likewise unchanged and good.

COMPARISON EXAMPLE 2

In the preparation of the redispersible powder employed in EXAMPLE 5 (VAc-NMA copolymer) the BCA in a form emulsified in water was admixed prior to the spraying of the aqueous dispersion of the copolymer. The powder obtained after spraying was not stable and underwent blocking.

EXAMPLE 6

150 g of methyltriethoxysilane (boiling point 142° C.) were applied as described above to 350 g of ROTISORB® from Roth and the resulting powder was admixed with the polyvinyl alcohol-stabilized, redispersible powder based on a vinyl acetate/ethylene copolymer (RE 545 Z® from Wacker-Chemie) in a ratio of 1:9.

The powder was very readily redispersible and stable to blocking. Co-spraying of the silane was not possible due to the low boiling point.

EXAMPLES 7–9

The dispersion powders modified in accordance with the invention were compared for use as tile adhesives with tile adhesive compositions in which the liquid additive was not added until during the preparation of the tile adhesive composition.

Tile adhesive basic formulation:
- 350 g of Portland cement PZ 35 F
- 120 g of quartz sand F 32 (from Quarzwerke Frechen)
- 476 g of quartz sand No. 12 (from Amberger Kaolinwerke)
- 50 g of dispersion powder
- 4 g of methylhydroxyethylcellulose ether (MHEC)
- 1000 g Quantity of make-up water: about 230 ml per 1000 g dry mixture Testing the wetting time:

For testing, Etaplan panels were coated using a toothed-edge applicator with the tile adhesive compositions indicated in Examples 7 to 9. Then, at one-minute intervals, ceramic tiles (5 cm×5 cm) were laid on and subjected to a force of 2 kg for 30 seconds each. The ceramic tiles were removed after one hour. The time (wetting time) was determined up to which application of the tiles could be delayed while still obtaining 50% wetting of the tiles with adhesive. The wetting time thus serves as a parameter for the "open time", the time within which the tile adhesive composition can still be processed. The term "base mixture" below refers to the above tile adhesive basic formulation minus the dispersion powder and cellulose ether fractions.

EXAMPLE 7

| | | | |
|---|---|---|---|
| Base mixture [g] | 94.6 | 94.6 | 94.6 |
| MHEC (15,000 mPas, unmodified) [g] | 0.4 | 0.4 | 0.4 |
| RI 538 Z ® (VAc/VeoVA/VL-copolymer, [g] | 5.0 | 5.0 | — |
| ARKOPAL ® N 060 (liquid) [g] | — | 0.1 | — |
| Modified powder from Ex. 2 [g] | — | — | 5.0 |
| Wetting time [min] | 7 | 14 | 12 |

EXAMPLE 8

| | | | |
|---|---|---|---|
| Base mixture [g] | 94.6 | 94.6 | 94.6 |
| MHEC (15,000 mPas, unmodified) [g] | 0.4 | 0.4 | 0.4 |
| LL 5001 ® (VAc/NMA) [g] | 5.0 | 5.0 | — |
| ARKOPAL ® N 060 (liquid) [g] | — | 0.1 | — |
| Modified powder from Ex. 4 [g] | — | — | 5.0 |
| Wetting time [min] | 7 | 11 | 13 |

EXAMPLE 9

| | | | |
|---|---|---|---|
| Base mixture [g] | 94.6 | 94.6 | 94.6 |
| MHEC (30,000 mPas, modified) [g] | 0.4 | 0.4 | 0.4 |
| RI 538 Z ® (VAc/VeoVA/VL-copolymer, [g] | 5.0 | 5.0 | — |
| ARKOPAL ® N 060 (liquid) [g] | — | 0.1 | — |

-continued

| | | | |
|---|---|---|---|
| Modified powder from Ex. 2 [g] | — | — | 5.0 |
| Wetting time [min] | 17 | 25 | 23 |

The results from Examples 7 to 9 show that the extension of the "open time" which is the aim of adding emulsifier is obtained both by subsequent addition of the liquid emulsifier to the pulverulent tile adhesive formulation and by using the dispersion powder modified with emulsifier in accordance with the invention. In this context, the use of the dispersion powder modified in accordance with the invention has the advantages for the processor that one processing step (mixing in the emulsifier) is saved, and the problem of the poor miscibility of liquid emulsifier with pulverulent tile adhesive formulation is avoided.

While several embodiments of the present invention have been shown and described, it is to be understood that many changes and modifications may be made thereunto without departing from the spirit and scope of the invention as defined in the appended claims.

What is claimed is:

1. A process for the preparation of water-redispersible dispersion powder compositions which are modified with additives and are based on polymers of ethylenically unsaturated compounds, comprising drying corresponding aqueous polymer dispersion of ethylenically unsaturated compounds;

applying additives, which are liquid at a temperature of ≦50° C., to a pulverulent carrier material powder; and adding the resulting powder to the dispersion during the drying of said dispersion.

2. The process as claimed in claim 1, wherein said carrier material is selected from group consisting of inorganic material and organic material with a particle size of from 0.005 to 3000 μm and a BET surface area of >10 m$^2$/g.

3. The process as claimed in claim 1, wherein said carrier material is selected from the group consisting of water-soluble carrier material and water-insoluble carrier material with a liquid uptake of from 10% to 75% by weight, based on the total weight of carrier material, in which the liquid additives are insoluble liquid additives.

4. The process as claimed in claim 3, wherein the carrier material is selected from the group consisting of precipitated chalk, finely divided carbonates, magnesium carbonate, calcium carbonate, magnesium hydrosilicates, titanium dioxide, argilaceous earths, bleaching earths, activated alumina, vermiculites, expanded perlite, phosphates, Na phosphate, water-soluble polyvinyl alcohol, water-insoluble polyvinyl alcohol, water-soluble cellulose, water-insoluble cellulose, water-soluble starch, water-insoluble starch, polyvinyl chloride powder, polystyrene powder, and the mixtures thereof.

5. The process as claimed in claim 1, comprising employing water-insoluble carrier materials in which the liquid additives are soluble and which can take up more than 10% by weight of their weight of the liquid additive without becoming sticky.

6. The process as claimed in claim 5, wherein the carrier material is selected from the group consisting of rubber, natural rubber, isoprene rubber, styrene-butadiene rubber, chloroprene rubber, butadiene-acrylonitrile rubber, isobutylene-isoprene rubber, ethylene-propylene-diene rubber, acrylate-butadiene rubber, polysulfide rubber, silicone rubber, butadiene rubber, epichlorohydrin-ethylene oxide rubber, thermosetting resin, epoxy resin, melamine-formaldehyde resin, urea-formaldehyde resin, phenol-formaldehyde resin, polyester resin, silicone resin, crosslinked polyvinyl alcohol, crosslinked polysaccharide, and the mixtures thereof.

7. A water-redispersible dispersion powder composition which is modified with additives which are liquid at a temperature of $\leqq 50°$ C. and are absorbed, enclosed or dissolved in a pulverulent carrier material powder, and is based on polymers of ethylenically unsaturated compounds and is prepared by a process according to claim 1.

8. A process for the preparation of water-redispersible dispersion powder compositions which are modified with additives and are based on polymers of ethylenically unsaturated compounds, comprising drying corresponding aqueous polymer dispersion of ethylenically unsaturated compounds;

applying additives, which are liquid at a temperature of $\leqq 50°$ C., to a pulverulent carrier material powder; and adding the resulting powder to the dispersion after the drying of said dispersion.

9. The process as claimed in claim 8, wherein said carrier material is selected from group consisting of inorganic material and organic material with a particle size of from 0.005 to 3000 $\mu$m and a BET surface area of >10 m$^2$/g.

10. The process as claimed in claim 8, wherein said carrier material is selected from the group consisting of water-soluble carrier material and water-insoluble carrier material with a liquid uptake of from 10% to 75% by weight, based on the total weight of carrier material, in which the liquid additives are insoluble liquid additives.

11. The process as claimed in claim 10, wherein the carrier material is selected from the group consisting of precipitated chalk, finely divided carbonates, magnesium carbonate, calcium carbonate, magnesium hydrosilicates, titanium dioxide, argilaceous earths, bleaching earths, activated alumina, vermiculites, expanded perlite, phosphates, Na phosphate, water-soluble polyvinyl alcohol, water-insoluble polyvinyl alcohol, water-soluble cellulose, water-insoluble cellulose, water-soluble starch, water-insoluble starch, polyvinyl chloride powder, polystyrene powder, and the mixtures thereof.

12. The process as claimed in claim 8, comprising employing water-insoluble carrier materials in which the liquid additives are soluble and which can take up more than 10% by weight of their weight of the liquid additive without becoming sticky.

13. The process as claimed in claim 12, wherein the carrier material is selected from the group consisting of rubber, natural rubber, isoprene rubber, styrene-butadiene rubber, chloroprene rubber, butadiene-acrylonitrile rubber, isobutylene-isoprene rubber, ethylene-propylene-diene rubber, acrylate-butadiene rubber, polysulfide rubber, silicone rubber, butadiene rubber, epichlorohydrin-ethylene oxide rubber, thermosetting resin, epoxy resin, melamine-formaldehyde resin, urea-formaldehyde resin, phenol-formaldehyde resin, polyester resin, silicone resin, crosslinked polyvinyl alcohol, crosslinked polysaccharide, and the mixtures thereof.

14. A water-redispersible dispersion powder composition which is modified with additives which are liquid at a temperature of $\leqq 50°$ C. and are absorbed, enclosed or dissolved in a pulverulent carrier material powder, and is based on polymers of ethylenically unsaturated compounds and is prepared by a process according to claim 8.

* * * * *